United States Patent Office 3,146,233
Patented Aug. 25, 1964

---

3,146,233
SUBSTITUTED DIHYDROBENZOTHIADIAZINE DERIVATIVES
Richard Hürmer, 5 Rue du Presbytère, Melun, France
No Drawing. Filed July 26, 1961, Ser. No. 126,901
Claims priority, application, Germany, July 28, 1960,
M 46,068
3 Claims. (Cl. 260—243)

The invention provides a method of manufacturing new C–3 substituted derivatives of dihydro benzothiadiazine. Said new derivatives constitute a second object of the invention.

As well known, benzothiadiazine dioxides and dihydrobenzothiadiazine dioxides are utilized as diuretics. However, normally C–3 substituted compounds of this class exhibit no or limited diuretic effect.

The unexpected fact has now been disclosed that C–3 substituted derivatives of dihydrobenzothiadiazine have excellent diuretic properties, provided it correspond to the following general formula:

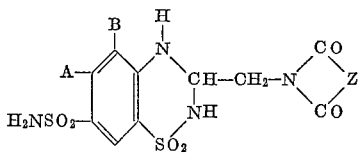

wherein A, B can be substituted as desired, viz., for A: Cl, $CF_3$, $CH_3$ for example and for B: H, Cl $CH_3$, and wherein Z stands for alkyl or aryl groups which can be substituted.

Further to its unusual diuretic action, said new compounds entrain, a high elimination of sodium, chloride and water and do only slightly influence the metabolism of potassium.

The new compounds appear as a fine crystallized powder, are less soluble in water, are soluble in bases (pH 9), in alcohols and acetone, and highly soluble in dimethyl and monomethylether of ethyleneglycol. The smelting point is comprised between about 200 and 260° C.

According to the invention, the synthesis of said new compounds is realized by condensing disulphonamido-4,6-anilines (with substituents A and or B) of the formula

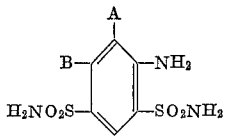

either with corresponding aldehydes of acetals or with a compound according to the formula

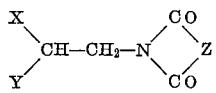

in which X is halogen, alkoxyl, substituted alkoxyl or

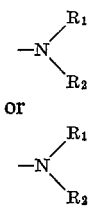

Y, is a group O-alkyl or

with $R_1$ being H, a group alkyl or aryl, $R_2$ being a group acyl, alkyl or aryl, where $R_1$ and $R_2$ may form a ring such as piperidine or morpholine, where X and Y may be in a same ring system, Z being a group alkyl or aryl which may be substituted.

As an example, X and Y may be derivatives substituted in 2-position of 1,3 diphenylimidazolidine.

Two examples of practicing the method of the invention are detailed below:

*Example 1*

3.9 g. of 3-chloro-4,6-disulfonamido-aniline are digested in 50 ml. of 50% acetic acid, and 2 g. phthalimidoacetaldehyde are added. After three hours of stirring, and standing over-night, the solution is brought to boiling and the solvent is drawn off in vacuum. 6-chlor-7-sulfonamido-3-phthalimidomethyl-3,4 - dihydro-1,2,4 - benzothiadiazine-1,1-dioxide crystallizes out. The yield is higher than 90%.

*Example 2*

4.2 g. of 3-trifluoromethyl-2,6-disulfonamidianiline are dissolved in 50 ml. of ethyleneglycol-dimethylether, acidified with HCl and 1.5 g. of succinimidoacetaldehyde are added slowly. The mixture is refluxed for three hours, cooled, and the solvent distilled off. 6-trisfluoromethyl-7-sulfonamido-3 - succinimidomethyl - 3,4 - dihydro - 1,2,4-benzothiadiazine-1,1 dioxide crystallizes out. The yield is approximately 95%.

What I claim is:
1. 6-chlor-7 - sulfonamido-3 - phthalimidomethyl-3,4-dihydro-1,2,4-benzothiadiazine-1,1-dioxide.
2. 6-trifluoromethyl-7-sulfonamido-3-succinimidomethyl-3,4-dihydro-1,2,4-benzothiadiazine-1,1 dioxide.
3. A compound of the formula

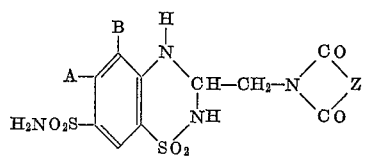

wherein A is a member of the group consisting of Cl, $CF_3$, $CH_3$, B is a member of the group consisting of H, Cl, $CR_3$, where

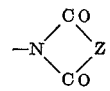

stands for a member selected from the group consisting of succinimido and phthalimido.

References Cited in the file of this patent
FOREIGN PATENTS
36,956    Luxembourg _____ May 4, 1959

OTHER REFERENCES
Wertheim: Textbook of Organic Chemistry, pp. 763–764 (1945).
Morton: The Chemistry of Heterocyclic Compounds, page VI of the preface (1946).
Jour. Amer. Medical Assoc., page 466, May 24, 1958.
Burger: Medicinal Chemistry, page 46 (1960).